(12) United States Patent  
Yin

(10) Patent No.: US 9,467,404 B2  
(45) Date of Patent: Oct. 11, 2016

(54) PROCESSING METHOD AND PROCESSING SYSTEM FOR INSTANT MESSAGES IN NETWORK CONFERENCE

(71) Applicant: Huawei Technologies Co., Ltd., Shenzhen, Guangdong (CN)

(72) Inventor: Yu Yin, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/938,019

(22) Filed: Jul. 9, 2013

(65) Prior Publication Data

US 2013/0318183 A1 Nov. 28, 2013

Related U.S. Application Data

(63) Continuation of application No. 13/685,293, filed on Nov. 26, 2012.

(30) Foreign Application Priority Data

Nov. 25, 2011 (CN) .......................... 2011 1 0381865

(51) Int. Cl.
*H04L 12/18* (2006.01)
*H04L 12/58* (2006.01)
*H04M 3/56* (2006.01)

(52) U.S. Cl.
CPC ......... *H04L 51/043* (2013.01); *H04L 12/1822* (2013.01); *H04L 12/581* (2013.01); *H04M 3/56* (2013.01); *H04M 3/563* (2013.01); *H04M 2207/20* (2013.01)

(58) Field of Classification Search
USPC ................ 709/201, 202, 203, 204, 205, 206
See application file for complete search history.

(56) References Cited

U.S. PATENT DOCUMENTS 7,120,455 B1 * 10/2006 Chen et al. .................... 455/466
7,151,753 B2 * 12/2006 Chaney et al. ................ 370/261

(Continued)

FOREIGN PATENT DOCUMENTS

CN 1708033 A 12/2005
CN 1868164 A 11/2006

(Continued)

OTHER PUBLICATIONS

Extended European Search Report in corresponding European Patent Application No. 12193959.9 (Apr. 12, 2013).

(Continued)

*Primary Examiner* — Saket K Daftuar
(74) *Attorney, Agent, or Firm* — Leydig, Voit & Mayer, Ltd.

(57) ABSTRACT

The embodiments of the present invention provide a processing method and processing system for instant messages in a network conference. The processing method for instant messages comprises: establishing connection between a conference application server and an instant message server, wherein the conference application server is further connected to a conference client, and the instant message server is further connected to an instant message client; and controlling message transfer between the conference application server and the conference client or between the instant message server and the instant message client according to the state of the conference client and the state of the instant message client. With the manners above, the processing method and processing system of the present invention enable a message client to which the conference client in the network conference corresponds to receive instant messages in a more humanized manner, thereby improving the experiences of the user.

18 Claims, 11 Drawing Sheets

(56) References Cited

U.S. PATENT DOCUMENTS

| | | | |
|---|---|---|---|
| 7,233,589 B2* | 6/2007 | Tanigawa et al. | 370/352 |
| 7,508,822 B2* | 3/2009 | Tanigawa et al. | 370/352 |
| 7,548,756 B2* | 6/2009 | Velthuis et al. | 455/466 |
| 7,664,490 B2* | 2/2010 | Aaby et al. | 455/416 |
| 8,121,626 B1* | 2/2012 | Kirchhoff et al. | 455/466 |
| 8,140,980 B2* | 3/2012 | Gunasekar et al. | 715/753 |
| 8,200,258 B2* | 6/2012 | Yahav et al. | 455/466 |
| 8,224,359 B2* | 7/2012 | Marlow et al. | 455/466 |
| 8,270,320 B2* | 9/2012 | Boyer et al. | 370/260 |
| 2002/0019243 A1* | 2/2002 | Zhang et al. | 455/466 |
| 2002/0118809 A1* | 8/2002 | Eisenberg | 379/202.01 |
| 2004/0001480 A1* | 1/2004 | Tanigawa et al. | 370/352 |
| 2004/0003046 A1* | 1/2004 | Grabelsky et al. | 709/206 |
| 2005/0015495 A1* | 1/2005 | Florkey et al. | 709/227 |
| 2005/0034079 A1* | 2/2005 | Gunasekar et al. | 715/753 |
| 2005/0071421 A1* | 3/2005 | Calo et al. | 709/203 |
| 2005/0071433 A1 | 3/2005 | Shah | |
| 2005/0149630 A1* | 7/2005 | Smolinski et al. | 709/227 |
| 2005/0223075 A1 | 10/2005 | Swearingen et al. | |
| 2006/0067250 A1* | 3/2006 | Boyer et al. | 370/260 |
| 2006/0271696 A1* | 11/2006 | Chen et al. | 709/229 |
| 2007/0076660 A1* | 4/2007 | Sung et al. | 370/329 |
| 2007/0110043 A1* | 5/2007 | Girard | 370/352 |
| 2007/0280464 A1* | 12/2007 | Hughes et al. | 379/205.01 |
| 2008/0040431 A1 | 2/2008 | Bleeker et al. | |
| 2008/0132259 A1* | 6/2008 | Vin | 455/466 |
| 2008/0261630 A1 | 10/2008 | Wormald et al. | |
| 2009/0003551 A1 | 1/2009 | MacIsaac | |
| 2009/0006555 A1* | 1/2009 | Curran et al. | 709/206 |
| 2010/0066807 A1* | 3/2010 | Eisenberg | 348/14.08 |
| 2010/0071053 A1* | 3/2010 | Ansari et al. | 726/12 |
| 2010/0115045 A1* | 5/2010 | Lin | 709/206 |
| 2010/0165888 A1* | 7/2010 | Turner | 370/260 |
| 2010/0174791 A1* | 7/2010 | Tian et al. | 709/206 |
| 2010/0221693 A1* | 9/2010 | Gupta | 434/362 |
| 2010/0223044 A1* | 9/2010 | Gisby et al. | 704/3 |
| 2011/0153735 A1* | 6/2011 | Eisenberg | 709/203 |
| 2011/0171934 A1* | 7/2011 | Lim et al. | 455/412.1 |
| 2011/0179179 A1* | 7/2011 | Lin | 709/226 |
| 2011/0191417 A1* | 8/2011 | Rathod | 709/204 |
| 2011/0208822 A1* | 8/2011 | Rathod | 709/206 |
| 2011/0305331 A1* | 12/2011 | Hughes et al. | 379/202.01 |
| 2012/0028623 A1* | 2/2012 | Verdon | 455/418 |
| 2012/0089924 A1* | 4/2012 | Weaver et al. | 715/752 |
| 2012/0117153 A1* | 5/2012 | Gunasekar et al. | 709/204 |
| 2012/0136932 A1 | 5/2012 | Deluca et al. | |
| 2012/0203821 A1* | 8/2012 | Czajka | 709/203 |
| 2012/0331066 A1* | 12/2012 | FitzGerald | 709/206 |

FOREIGN PATENT DOCUMENTS

| | | |
|---|---|---|
| CN | 101034990 A | 9/2007 |
| WO | WO 2006028850 A2 | 3/2006 |
| WO | WO 2007053286 A2 | 5/2007 |

OTHER PUBLICATIONS

U.S. Appl. No. 13/685,293, filed Nov. 26, 2012.

Office Action in corresponding U.S. Appl. No. 13/685,293 (Sep. 22, 2014).

Office Action is corresponding U.S. Appl. No. 13/685,293 (Jul. 24, 2015).

4th Office Action in corresponding U.S. Appl. No. 13/685,293 (Apr. 25, 2016).

* cited by examiner

PROCESSING METHOD AND PROCESSING SYSTEM FOR INSTANT MESSAGES IN NETWORK CONFERENCE

CROSS-REFERENCE TO RELATED APPLICATIONS

This application is a continuation of U.S. patent application Ser. No. 13/685,293, filed on Nov. 26, 2012, which claims priority to Chinese Patent Application No. 201110381865.3, filed on Nov. 25, 2011, which is hereby incorporated by reference in its entirety.

TECHNICAL FIELD

The present invention relates to the technical field of network conference, and in particular to a processing method processing system for instant messages in a network conference.

BACKGROUND

As the development of network technologies, the network conference is gradually accepted by the people and has become the major option for remote conference. In unified communication (UC), users have multiple terminals and multiple communication and coordination manners, such as participation in a multimedia conference, instant message chatting, internet telephone or intra-enterprise phone call. For example, in a multimedia conference (including voice and network), users may use mobile phone, fixed-line phone, IP phone, and network telephone client, etc. to access a voice conference, and may also use personal computer or smart mobile phone terminal to access a network conference. During the conference, users may talk, share contents, listen and chat with typing, etc. Furthermore, in the current UC technology, different states, such as busy state, and idle state, etc., of users in different communication manners may be registered in a presence server so that other communication calls or session managers may be aware of some states of the current users.

However, in many cases, the real-time activities and actual states of users in the above various communication manners are not presented in the presence server. For example, if other users have subscribed the current state of a user being in conference, these other users may only see the state that the user is in a conference (or in a telephone conversation), although in the conference that may last several hours, the user may be sometimes in talking, sometimes in listening, or sometimes in chatting with typing. Some relatively advanced UC systems may expand the current state, while detect the activities of a user in conference, and determine whether the user is currently in a busy state or an idle state based on the active states of the user. If the user is in an idle state, the UC systems may allow other communication manners to be used for conversation with this user. However, such improvement requires not only addition of corresponding detecting and judging modules (or rules engine), but also expansion of the presence server at the same time. Furthermore, in practice, users may have multiple states in different conferences or in different moments of a conference, it is impossible to make changes to the presence server for the addition of each of the states, and at the same time, and sometimes excessive states are unnecessary, since not every subscriber is interested in tiny changes of states. In addition, although privacy of states is defined in the specifications of the presence servers, namely, some states may be visible to certain users, while some states are invisible, this also needs pre-configuration.

SUMMARY

The major technical problem to be solved by the present invention is to provide a processing method and processing system for instant messages in a network conference, which is capable of controlling message transfer between a conference application server and a conference client or between an instant message server and an instant message client according to the state of the conference client and the state of the instant message client, so that the experiences of the user can be improved.

In order to solve the above technical problem, one aspect of the present invention is to provide a processing method for instant messages in a network conference, the processing method for instant messages comprises: establishing connection between a conference application server and an instant message server, wherein the conference application server is further connected to a conference client, and the instant message server is further connected to an instant message client; and controlling message transfer between the conference application server and the conference client or between the instant message server and the instant message client according to the state of the conference client and the state of the instant message client.

In order to solve the above technical problem, another aspect of the present invention is to provide a massage processing system in a network conference, the massage processing system comprising a conference application server and an instant message server. Wherein the conference application server comprises: a communication unit configured to establish connection to an instant message server, wherein the communication unit is further connected to a conference client, and the instant message server is further connected to an instant message client; and a control unit configured to control message transfer between the conference application server and the conference client or between the instant message server and the instant message client according to the state of the conference client and the state of the instant message client.

The processing method and processing system for instant messages in a network conference of the embodiments of the present invention control message transfer between the conference application server and the conference client or between the instant message server and the instant message client according to the state of the conference client and the state of the instant message client, so that each participant in the conference may more friendly communication with others via instant messages; that is, all the instant messages sent to the user are under control when the user shares a desktop, ensuring that the instant messages sent to the user would not be seen by others in the conference and protecting the privacy; and on the other hand, when the participant in the conference is not ready for making response to an instant message, the application server will initiatively assist the user to make response to the sender of the instant message by sending an instant prompt message, prompting the progress of the conference to the sender, so that the experiences of the user can be improved.

DETAILED DESCRIPTION

Figure 1:
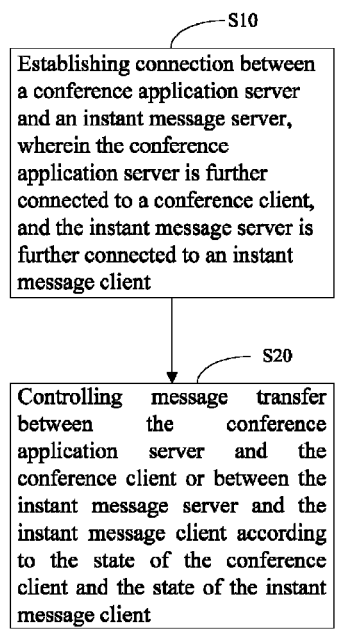
FIG. 1 is a flowchart of the processing method for instant messages in a network conference of the embodiments of the present invention.

Refer to FIG. 1, which is a flowchart of the processing method for instant messages in a network conference of the embodiments of the present invention. The processing method for instant messages in a network conference of this embodiment mainly comprises the following steps:

Step S10: establishing connection between a conference application server and an instant message server. Wherein the conference application server is further connected to a conference client, and the instant message server is further connected to an instant message client.

Step S20: controlling message transfer between the conference application server and the conference client or between the instant message server and the instant message client according to the state of the conference client and the state of the instant message client.

Figure 2:
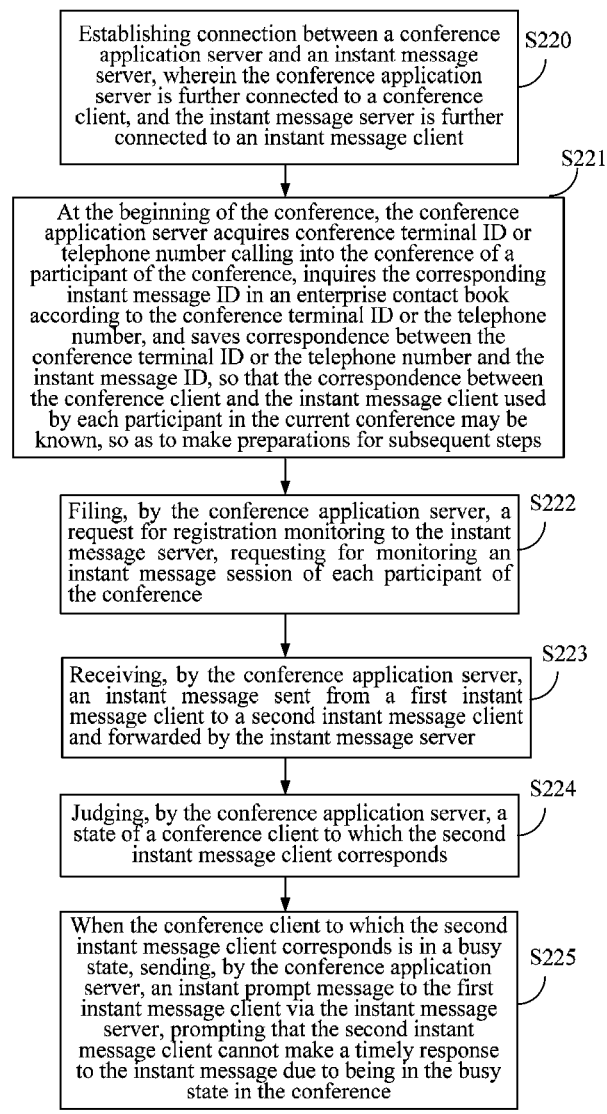
FIG. 2 is a flowchart of the first embodiment of the processing method for instant messages in a network conference of the present invention.
Figure 3:
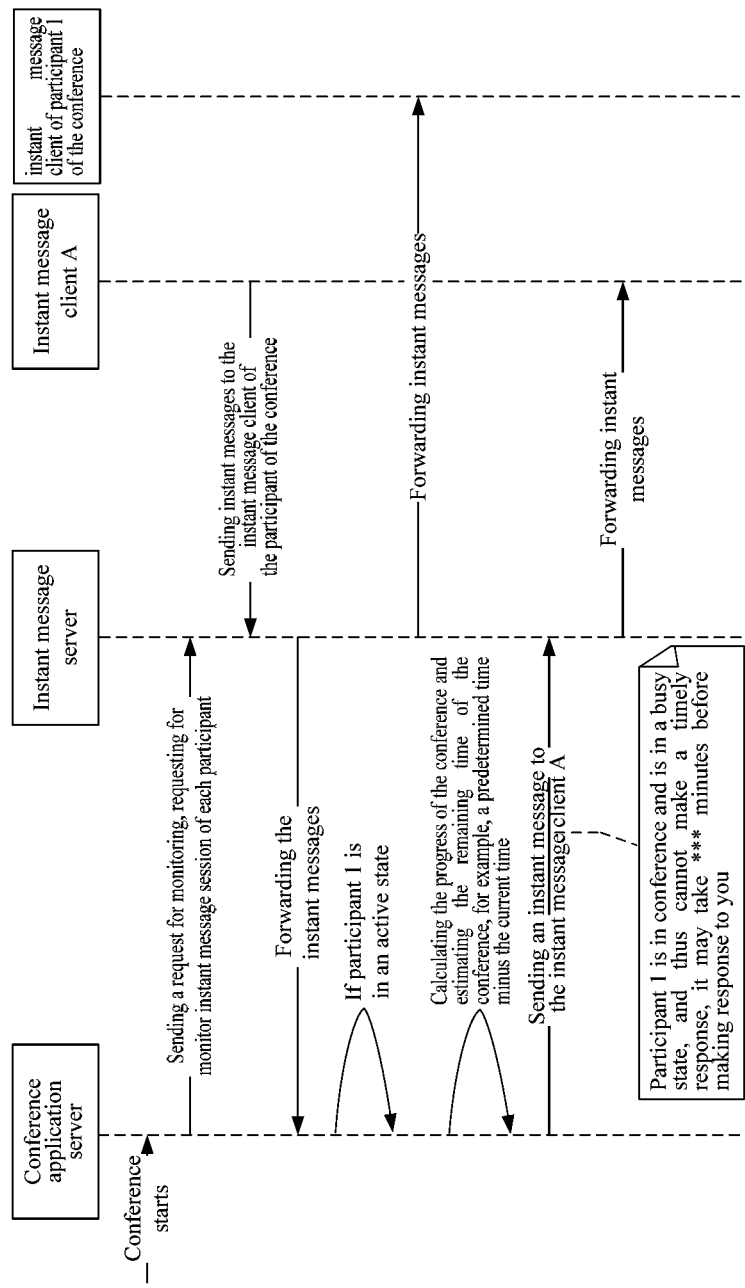
FIG. 3 is another flowchart of the first embodiment of the processing method for instant messages in a network conference of the present invention.

Refer to FIGS. 2-3, which are flowcharts of the first embodiment of the processing method for instant messages in a network conference of the present invention.

Particularly, in this embodiment, the processing method for instant messages in a network conference mainly comprises the following steps:

Step S220: establishing connection between a conference application server and an instant message server. Wherein the conference application server is further connected to a conference client, and the instant message server is further connected to an instant message client.

Step S221: at the beginning of the conference, the conference application server acquires conference terminal ID or telephone number calling into the conference of a participant of the conference, inquires the corresponding instant message ID in an enterprise contact book according to the conference terminal ID or the telephone number, and saves correspondence between the conference terminal ID or the telephone number and the instant message ID, so that the correspondence between the conference client and the instant message client used by each participant in the current conference may be known, so as to make preparations for subsequent steps.

wherein, the telephone number calling into the conference of a participant of the conference may be a telephone number of a mobile phone, an IP phone, or a fixed-line phone;

Step S222: filing, by the conference application server, a request for registration monitoring to the instant message server, requesting for monitoring an instant message session of each participant of the conference;

Step S223: receiving, by the conference application server, an instant message sent from a first instant message client to a second instant message client and forwarded by the instant message server;

Step S224: judging, by the conference application server, a state of a conference client to which the second instant message client corresponds; and Step S225: when the conference client to which the second instant message client corresponds is in a busy state, sending, by the conference application server, an instant prompt message to the first instant message client via the instant message server, prompting that the second instant message client cannot make a timely response to the instant message due to being in the busy state in the conference.

The conference application server further estimates the time period during which the conference client to which the second instant message client corresponds is in a busy state, and adds the time to the instant prompt message, informing the progress of the conference to the sender of the instant message.

Particularly, in the embodiment of the present invention, in a network conference, when a participant of the conference is in desktop-sharing, talking or attentive listening, he or she may receive an instant message sent by the first instant message client, but is not convenient to terminate the current speaking or interrupt the attentive listening to make an immediate response, so as not to affect the progress of the conference. In this case, the conference application server sends a prompt message to the first instant message client via the instant message server. For example, the content of the prompt message may be:

"XXX is in conference and is in a busy state, and thus cannot make a timely response; it may take *** minutes before making response to you. Sorry for any inconvenience".

As stated above, the prompt message is used to prompt/inform the first instant message client that the current second instant message client is in a busy state in the conference, and hence, cannot make a timely response to the instant message. Furthermore, the conference application server can estimate the progress of the conference, for example, calculates the estimated remaining time of the conference according to the predetermined conference termination time minus the conference start time, so as to estimate the duration of the state that the conference client to which the second instant message client corresponds may be busy in speaking or attentive listening, and prompt the progress of the conference to the sender of the instant message. In this way, on the one hand, it is possible not to interfere and interrupt the progress of conference of the receiver of the instant message in desktop-sharing, speaking or attentive listening would not be; and on the other hand, the sender of the instant message is enabled to understood clearly the reason that his/her instant message is not timely responded, so that the experiences of the instant message client can be improved.

Figure 4:
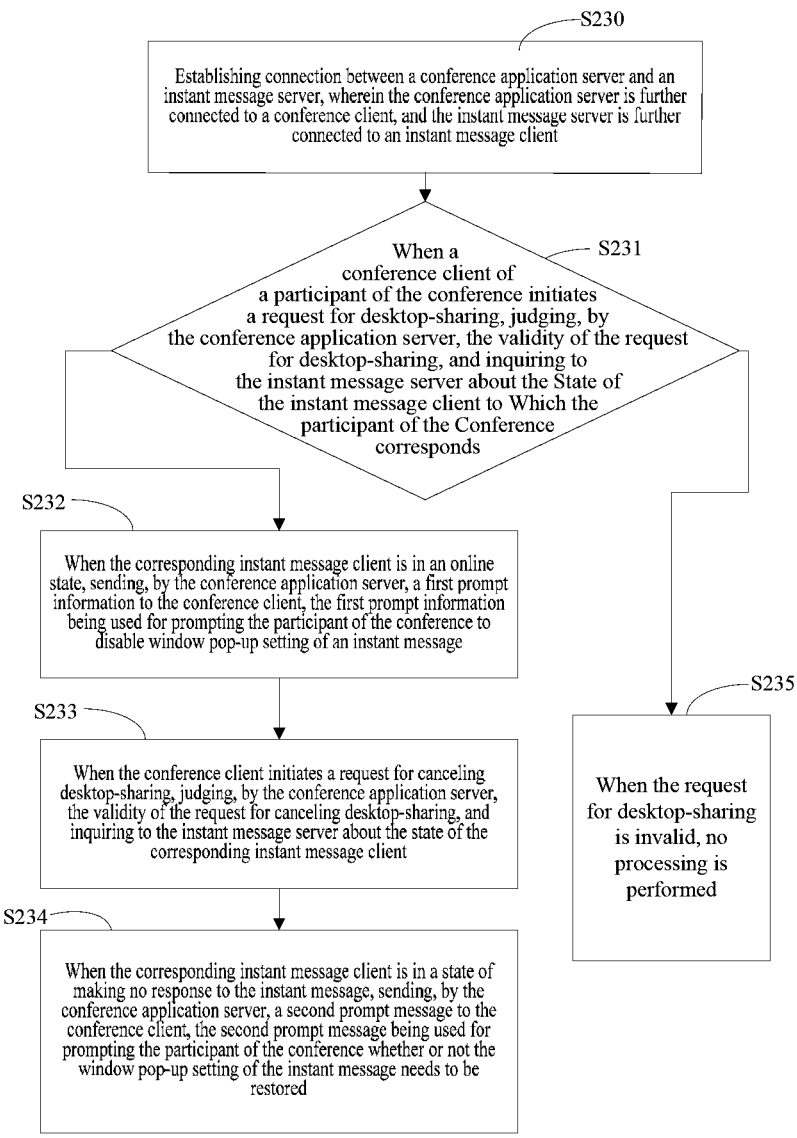
FIG. 4 is a flowchart of the second embodiment of the processing method for instant messages in a network conference of the present invention.
Figure 5:
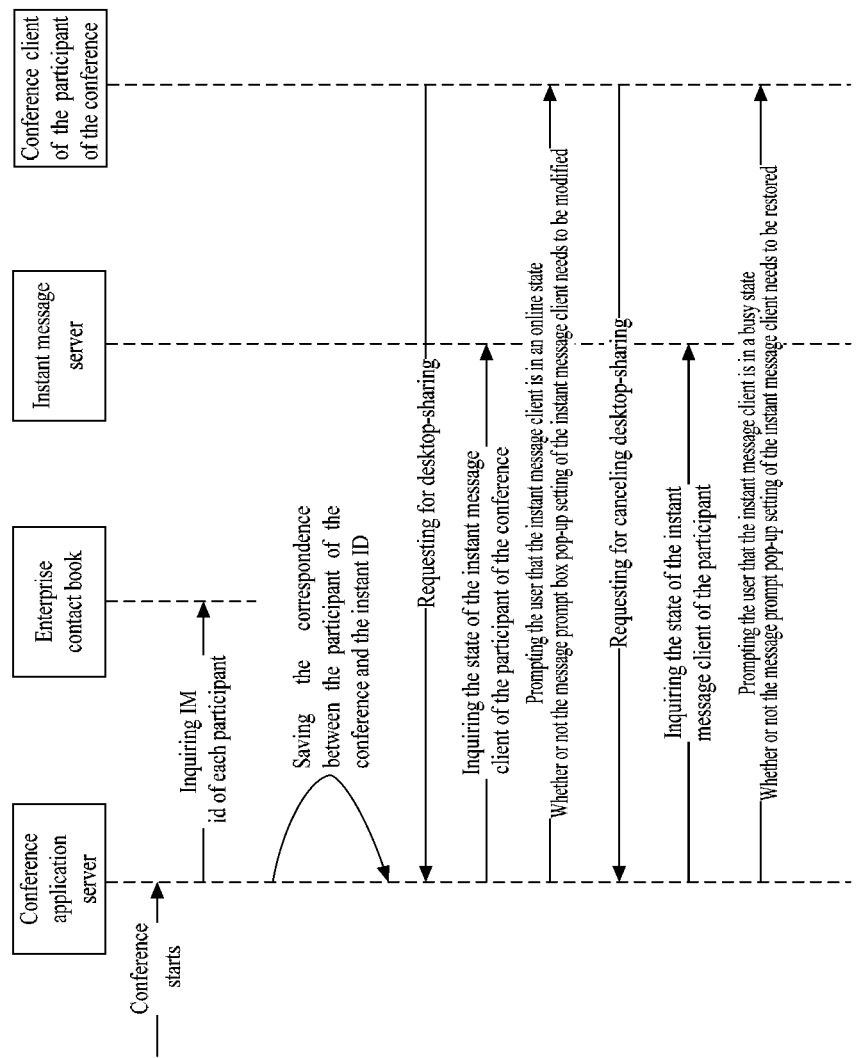
FIG. 5 is another flowchart of the second embodiment of the processing method for instant messages in a network conference of the present invention.

FIGS. 4 and 5 are flowcharts of the second embodiment of the processing method for instant messages in a network conference of the present invention.

Referring to FIGS. 4 and 5, the second embodiment of the processing method for instant messages in a network conference mainly comprises the following steps:

Step S230: establishing connection between a conference application server and an instant message server. Wherein the conference application server is further connected to a conference client, and the instant message server is further connected to an instant message client;

Step S231: when a conference client of a participant of the conference initiates a request for desktop-sharing, judging, by the conference application server, the validity of the request for desktop-sharing, and inquiring to the instant message server about the state of the instant message client to which the participant of the conference corresponds;

when the request for desktop-sharing is valid, it goes to Step S232; and when the request for desktop-sharing is invalid, it goes to Step S235 without processing;

Step S232: when the corresponding instant message client is in an online state, sending, by the conference application server, a first prompt information to the conference client, the first prompt information being used for prompting the participant of the conference to disable the window pop-up setting of an instant message;

Step S233: when the conference client initiates a request for canceling desktop-sharing, judging, by the conference application server, the validity of the request for canceling desktop-sharing, and inquiring to the instant message server about the state of the corresponding instant message client;

when the request for canceling desktop-sharing is valid, it goes to Step S234; and when the request for canceling desktop-sharing is invalid, it returns to Step S233;

Step S234: when the corresponding instant message client is in a state of making no response to the instant message, sending, by the conference application server, a second prompt message to the conference client, the second prompt message being used for prompting the participant of the conference whether or not the window pop-up setting of the instant message needs to be restored.

Figure 6:
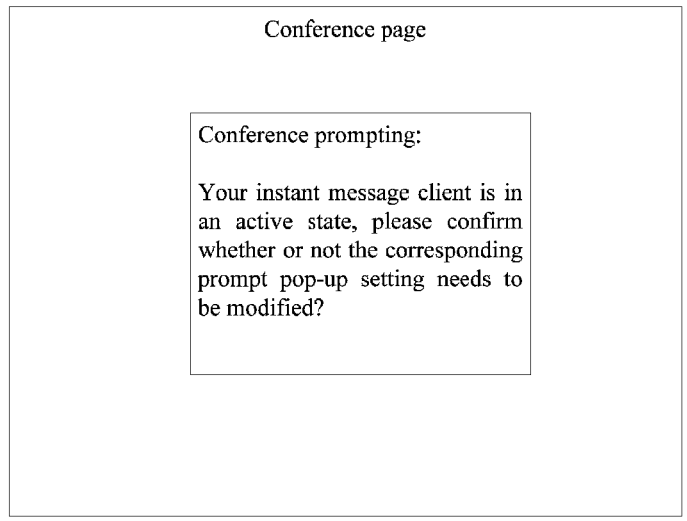
FIG. 6 is a schematic diagram of prompting of closing a pop-up window of an instant message in the second embodiment of the processing method for instant messages in a network conference of the present invention.

Refer to FIG. 6, which is a schematic diagram of a pop-up window of a first instant message in the processing method for instant messages in a network conference of the present invention.

In the above Step S232, when the user requests for desktop-sharing and the corresponding instant message client is in an online state, the following first prompt information is popped up on the current conference page:

"Your instant message client is in an active state, please confirm whether or not the corresponding prompt pop-up setting needs to be modified".

Of course, the particular content of the prompting words of the first prompt information may be replaced with other prompting words according to actual demands, which are used to prompt the participant of the conference to disable the pop-up window of the instant message, so as to avoid popping up the received instant message on the shared desktop and protect privacy of personal information better.

Figure 7:
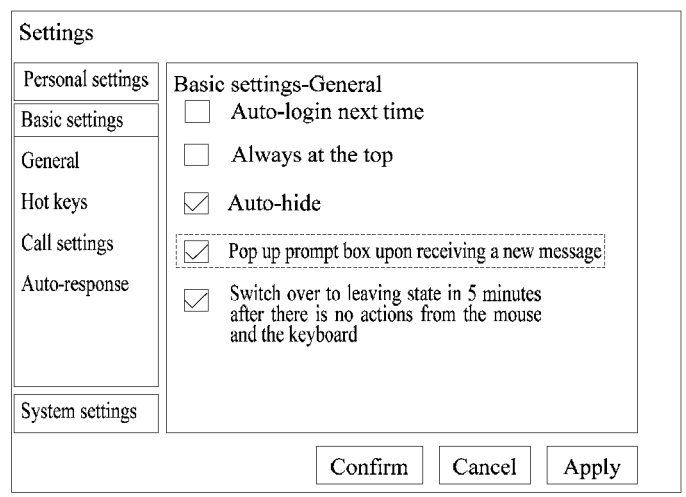
FIG. 7 is a schematic diagram of modifying the window pop-up setting of an instant message in the second embodiment of the processing method for instant messages in a network conference of the present invention.

FIG. 7 is a schematic diagram of modifying the window pop-up setting of an instant message of an embodiment of the present invention. Referring to FIG. 7, a setting page comprises personal settings, basic settings and system settings, wherein the basic settings comprise general, hot-keys and call settings and auto-response. If the settings of the user before the conference are as shown in FIG. 7, in which the option of "pop-up prompt box upon receiving a new message" is checked, the user can reset the instant message client upon seeing the first prompt message as shown in FIG. 6, thereby preventing the instant message from being popped up when the desktop is shared during the conference.

Particularly, upon seeing the first prompt message prompting to disable a pop-up prompt box of an instant message as shown in FIG. 6, the participant of the conference can modify the prompt box pop-up setting of the instant message and make the option of "pop-up prompt box upon receiving a new message" not be checked. In this way, during the conference, the received instant message will not be popped up on the shared desktop, and thus not only the progress of the conference would not be affected, but also the private session messages of the participant of the conference can be protected.

Furthermore, when the user cancels desktop-sharing during the conference, in step S234, the conference application server sends a second prompt message to the conference client for prompting the participant of the conference whether or not to restore the box pop-up setting of the instant message, the prompt window of the second prompt message is similar to that of the first prompt message shown in FIG. 6, and its description would not be repeated.

Thereafter, the participant of the conference may likewise restore the response state with respect to the instant message by checking the option of "pop-up prompt box upon receiving a new message" via the prompt box shown in FIG. 7.

By means of the manner above, the processing method for instant messages in a network conference of an embodiment of the present invention controls message transfer between the conference application server and the conference client or between the instant message server and the instant message client according to the state of the conference client and the state of the instant message client. The instant messages sent to the user are under control when the user shares desktop in the conference, avoiding display of the personal instant message session of the participant of the conference on the shared desktop, ensuring that the instant messages sent to the user are invisible to others in the conference and protecting the privacy of personal information.

Figure 8:
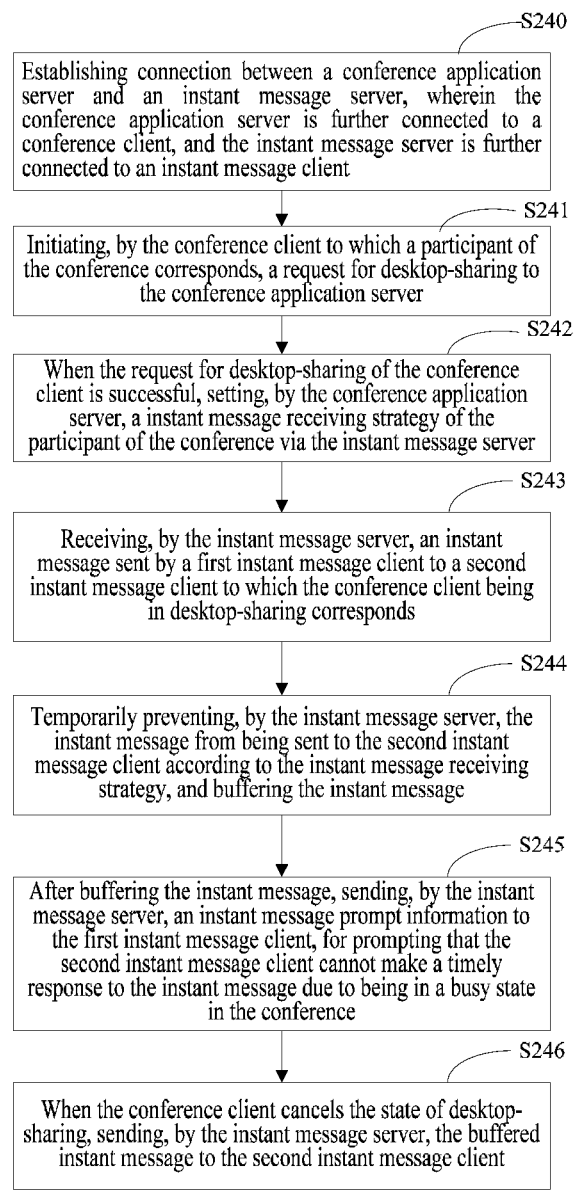
FIG. 8 is a flowchart of the third embodiment of the processing method for instant messages in a network conference of the present invention.
Figure 9:
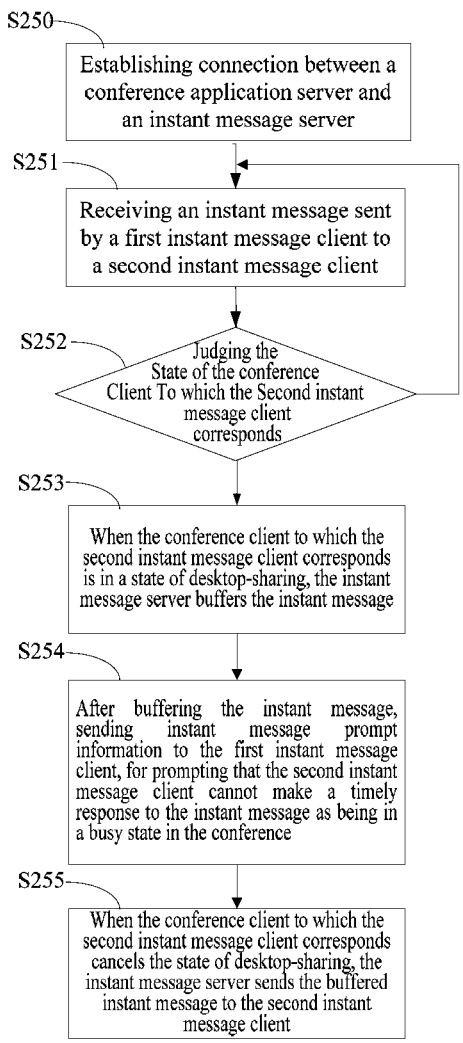
FIG. 9 is another flowchart of the third embodiment of the processing method for instant messages in a network conference of the present invention.

Refer to FIGS. 8 and 9, which are flowcharts of the third embodiment of the processing method for instant messages in a network conference of the present invention, to illustrate the processing method for instant messages when a conference client is in a state of desktop-sharing in the conference.

Particularly, in this embodiment, the processing method for instant messages in a network conference mainly comprises the following steps:

Step S240: establishing connection between a conference application server and an instant message server. Wherein the conference application server is further connected to a conference client, and the instant message server is further connected to an instant message client;

Step S241: initiating, by the conference client to which a participant of the conference corresponds, a request for desktop-sharing to the conference application server;

Step S242: when the request for desktop-sharing of the conference client is successful, setting, by the conference application server, a instant message receiving strategy of the participant of the conference via the instant message server;

Step S243: receiving, by the instant message server, an instant message sent by a first instant message client to a second instant message client to which the conference client being in desktop-sharing corresponds;

Step S244: temporarily preventing, by the instant message server, the instant message from being sent to the second instant message client according to the instant message receiving strategy, and buffering the instant message;

Step S245: after buffering the instant message, sending, by the instant message server, an instant message prompt information to the first instant message client, for prompting that the second instant message client cannot make a timely response to the instant message due to being in a busy state in the conference.

For example, the content of the instant prompt message is:

"XXX is in a busy state in the conference, and may not make a timely response".

The above prompt message is used to prompt/inform the first instant message client that the second instant message client cannot make a timely response to the instant message sent by the first instant message client.

Furthermore, the conference application server estimates the progress of the conference, for example, calculates the estimated remaining time of the conference according to the predetermined conference termination time minus the conference start time, so as to prompt the progress of the conference to the sender of the instant message, and send a prompt message to inform the first instant message client.

At this moment, for example, the content of the instant prompt message is:

"XXX is in conference and is in a busy state, and thus cannot make a timely response; it may take *** minutes before making response to you".

Step S246: when the conference client cancels the state of desktop-sharing, sending, by the instant message server, the buffered instant message to the second instant message client.

Figure 10:
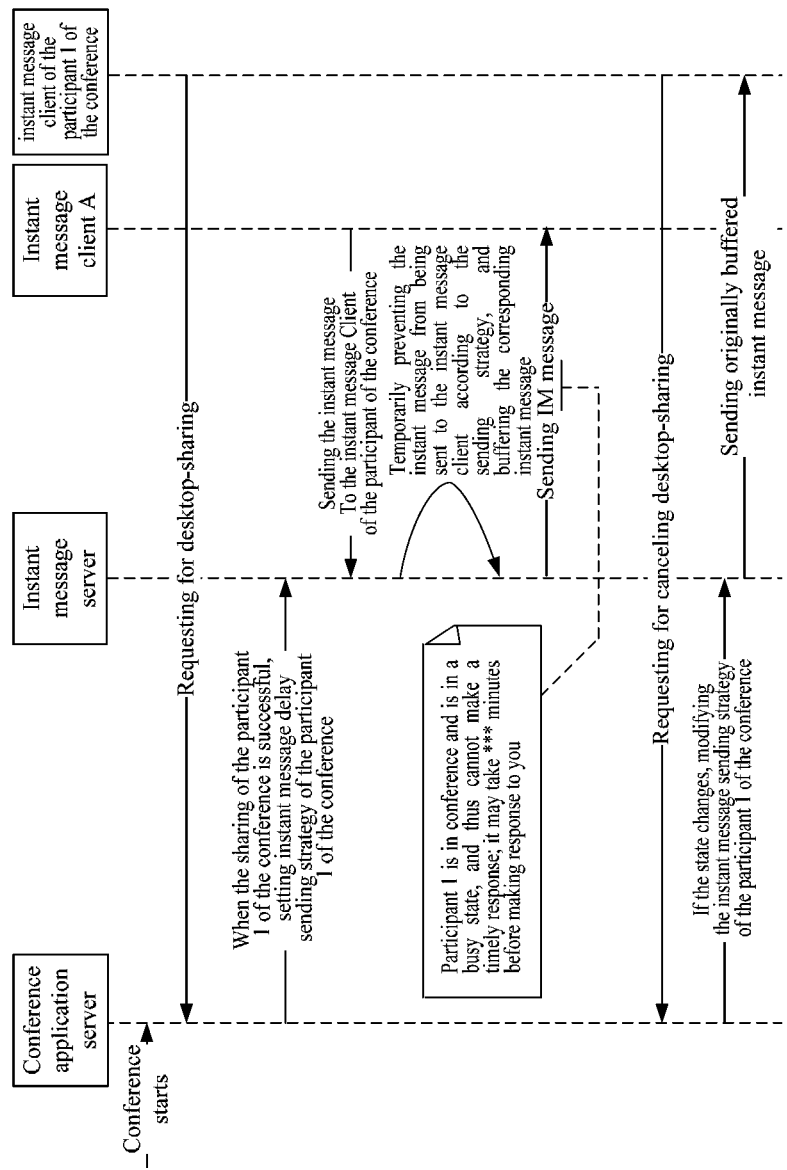
FIG. 10 is a flowchart of the fourth embodiment of the processing method for instant messages in a network conference of the present invention.

Refer to FIG. 10, which is a flowchart of the fourth embodiment of the processing method for instant messages in a network conference of the present invention, to illustrate a processing method for instant messages when a conference client is in a state of desktop-sharing in the conference.

Particularly, in this embodiment, the processing method for instant messages in a network conference mainly comprises the following steps:

Step S250: establishing connection between a conference application server and an instant message server. Wherein the conference application server is further connected to a conference client, and the instant message server is further connected to an instant message client;

Step S251: receiving an instant message sent by a first instant message client to a second instant message client;

Step S252: judging the state of the conference client to which the second instant message client corresponds;

Step S253: when the conference client to which the second instant message client corresponds is in a state of desktop-sharing, the instant message server buffers the instant message;

and when the conference client to which the second instant message client corresponds is not in a state of desktop-sharing, returning to Step S251.

Step S254: after buffering the instant message, sending instant message prompt information to the first instant message client, for prompting that the second instant message client cannot make a timely response to the instant message due to being in a busy state in the conference.

for example, the content of the instant prompt message is:

"XXX is in a busy state in the conference, and may not make a timely response".

The above prompt message is used to prompt/inform the first instant message client that the second instant message client cannot make a timely response to the instant message sent by the first instant message client.

Furthermore, the conference application server estimates the progress of the conference, for example, calculates the estimated remaining time of the conference according to the predetermined conference termination time minus the conference start time, so as to prompt the progress of the conference to the sender of the instant message, and send a prompt message to inform the first instant message client;

At this moment, for example, the content of the instant prompt message is:

"XXX is in conference and is in a busy state, and thus cannot make a timely response; it may take *** minutes before making response to you".

Step S255: when the conference client to which the second instant message client corresponds cancels the state of desktop-sharing, the instant message server sends the buffered instant message to the second instant message client.

The above third and fourth embodiments of the present invention may incorporate two communication manners of network conference and instant message, temporarily prevent the instant information from being received by the participant of the conference desktop-sharing by setting a delay sending strategy of the instant message server, buffer the instant information sent to the participant of the conference desktop-sharing, and resend the buffered instant message when the participant of the conference cancels desktop-sharing, thereby protecting the private information of the user without affecting progress of the conference, and improving the experiences of the user.

With the above manners, the processing method for instant messages in a network conference of an embodiment of the present invention controls message transfer between the conference application server and the conference client or between the instant message server and the instant message client according to the state of the conference client and the state of the instant message client, incorporates two communication manners of network conference and instant message, and prompts the participant of the conference going to share the desktop to disable the pop-up setting of the instant message, or temporarily prevents the instant message from being sent to the instant message client of the participant of the conference desktop-sharing, thereby protecting the private information of the user. On the other hand, when the participant in the conference is in the active state and is not ready for making response to an instant message, the application server initiatively assists the user to make response to the instant message, prompting the progress of the conference to the sender, so that the experiences of the user can be improved.

To implement the above flows, the conference application server needs to implement IM (instant messaging) protocols and perform a function of message monitoring. Currently, there are four popular IM protocols in the industry of instant message service: XMPP (the Extensible Massaging and Presence Protocol) protocol, instant messaging and presence protocol (IMPP), presence and instant messaging protocol (PRIM), and SIP (Session Initiation Protocol) for Instant Messaging and Presence Leveraging Extensions. Following is the description of the implementation of a protocol based on XMPP, and the implementation of other protocols is similar to this.

XMPP is an open protocol based on XML architecture, and is widely used in instant message communication. The particular process of implementation based on Jabber would be described briefly below.

In order to monitor of an instant message, a Jabber session manager (JSM) provides processing for a specific receiver as shown in the following steps:

Step I: receiving, by the JSM, an instant message, and judging whether a user is on line or not;

Step II: analyzing the resources of the receiver, if the user is on line;

Step III: sending to monitors, the JSM initiates two monitors at the beginning of service with one is to, and the other is from, the former monitoring all the sessions of the receiver, and the latter monitoring all the sessions of the sender;

Step IV: once the two monitors have corresponding modules registered, sending to corresponding modules for processing; and Step V: once a designated module finishes processing a package, sending the package back to a monitoring program for subsequent processing by more modules, and if all the processing is finished, sending the package to a message source or a message destination.

Hence, to implement monitoring of a particular instant message client receiver, the only requirement is that the conference application server implements the listener API interface, and then the implementation is added to a corresponding listener container of the JSM.

Figure 11:
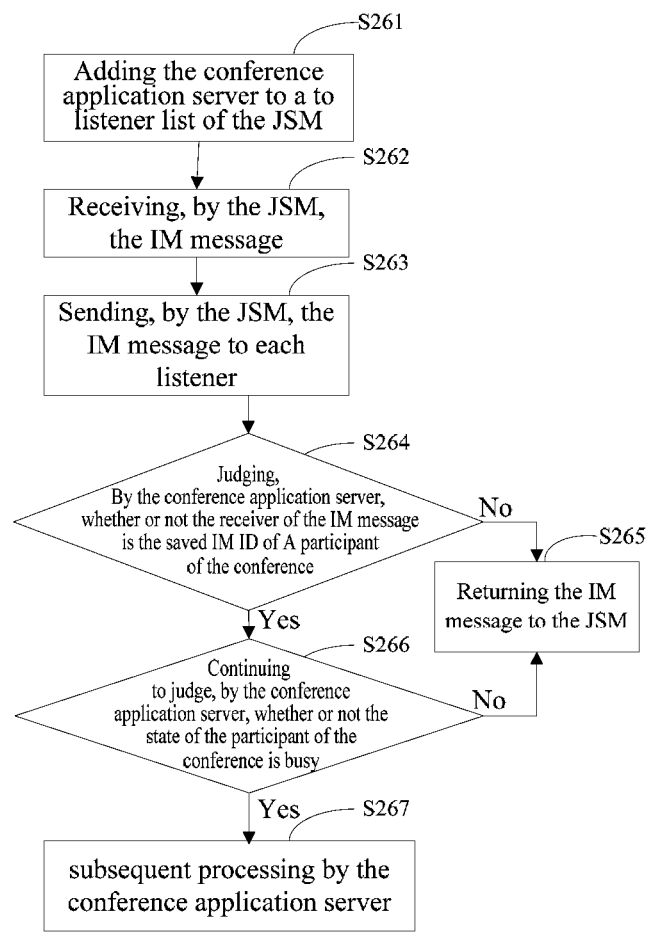
FIG. 11 is a flowchart of realizing monitoring of instant message session in the processing method for instant messages in a network conference of the present invention.

Refer to FIG. 11, which is a flowchart of implementing monitoring of the above session state with the JSM flow. According to the JSM flow, the steps of monitoring the above session state are as follows:

Step S261: adding the conference application server to a to listener list of the JSM;

Step S262: receiving, by the JSM, the instant message;

Step S263: sending, by the JSM, the instant message to each listener;

Step S264: judging, by the conference application server, whether or not the receiver of the instant message is the saved instant message ID of a participant of the conference; if the receiver of the instant message is the saved instant message ID of the participant of the conference, it goes to Step S266; and if the receiver of the instant message is not the saved instant message ID of the participant of the conference, it goes to Step S265;

Step S265: returning the instant message to the JSM.

Step S266: continuing to judge, by the conference application server, whether or not the state of the participant of the conference is busy; if the state of the participant of the conference is busy, it goes to Step S267; and if the state of the participant of the conference is not busy, it goes to Step S265.

Step S267: subsequent processing by the conference application server.

Figure 12:
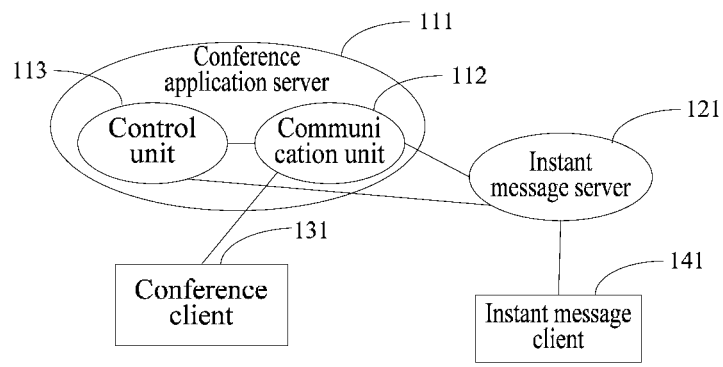
FIG. 12 is a block diagram of the first embodiment of the message processing system in a network conference of the present invention.

Refer to FIG. 12, which is a block diagram of the first embodiment of the message processing system in a network conference of the present invention. In this embodiment, the message processing system in a network conference comprises a conference application server 111, an instant message server 121, a conference client 131, and an instant message client 141.

The conference application server 111 comprises a communication unit 112 and a control unit 113. The communication unit 112 is used to establish connection with the instant message server 121, wherein the communication unit 112 is further connected to the conference client 131, and the instant message server 121 is further connected to the instant message client 141. The control unit 113 is connected to the communication unit 112 and the instant message server 121, and controls message transfer between the conference application server 111 and the conference client 131 or between the instant message server 121 and the instant message client 141 according to the state of the conference client 131 and the state of the instant message client 141.

The communication unit 112 establishes connection with the instant message server 121.

With the manner above, the conference application server of this embodiment controls message transfer between the conference application server and the conference client or between the instant message server and the instant message client according to the state of the conference client and the state of the instant message client, such that the instant message client to which the conference client in the network conference corresponds is able to receive instant messages in a more humanized manner.

Figure 13:
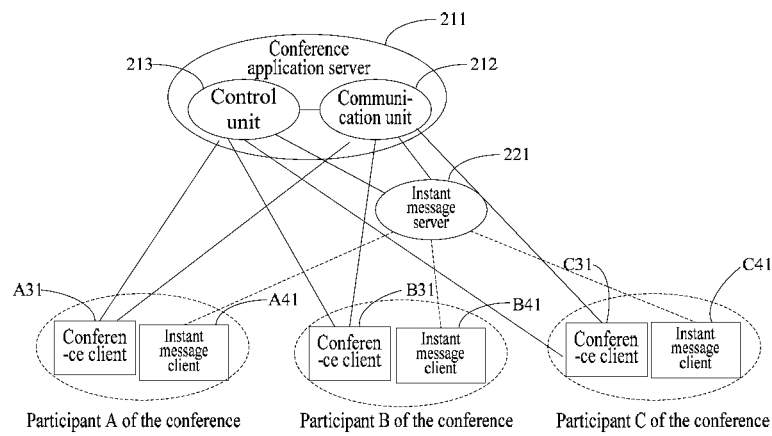
FIG. 13 is a block diagram of the second embodiment of the message processing system in a network conference of the present invention.
Figure 14:
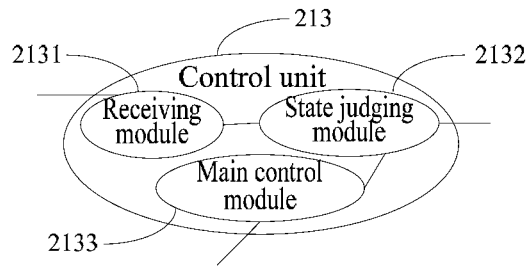
FIG. 14 is a block diagram of the control unit in FIG. 13.

Referring to FIGS. 13 and 14, FIG. 13 is a block diagram of the second embodiment of the message processing system in a network conference of the present invention, and FIG. 14 is a block diagram of the control unit in FIG. 13. In this embodiment, the message processing system in a network conference comprises a conference application server 211, an instant message server 221, a plurality of conference clients respectively connected to the conference application server 211, such as conference clients A31, B31 and C31, and a plurality of instant message clients respectively connected to the instant message server 221, such as instant message clients A41, B41 and C41.

Wherein, the conference application server 211 comprises a communication unit 212 and a control unit 213.

The communication unit 212 is used to establish connection with the instant message server 221, wherein the communication unit 212 is further connected to the conference clients A31, B31 and C31, and the instant message server 221 is further connected to the instant message clients A41, B41 and C41.

The control unit 213 is connected to the communication unit 212 and the instant message server 221. Referring to FIG. 14, the control unit 213 further comprises a receiving module 2131, a state judging module 2132 and a main control module 2133. Wherein, the receiving module 2131 is used to receive an instant message session of each participant of the conference forwarded by the instant message server 221, so as to monitor the instant message sessions of every participant of the conference.

The state judging module 2132 is used to judge the states of the conference client and instant message client to which each participant of the conference corresponds.

The main control module 2133 is used to control the transfer of the instant message according to the result of state judgment of the state judging module 2132.

Particularly, an embodiment of the message processing system in a network conference of the present invention shall be described taking the transfer of information between a participant A and a participant B in the conference as shown in FIG. 13 as an example.

At the beginning of the conference, the communication unit 212 acquires the conference terminal ID or telephone number calling into the conference of the participant A and the participant B, respectively, and inquires a corresponding instant message ID in an enterprise contact book according to the conference terminal ID or the telephone number, and saves correspondence between the conference terminal ID or the telephone number and the instant message ID.

The receiving module 2131 receives an instant message sent by a first instant message client A 41 to a second instant message client B41 and forwarded by the instant message server 221;

the state judging module 2132 judges a state of the conference client B31 to which the second instant message client B41 corresponds.

When the state judging module 2132 judges that the conference client B31 is in a busy state, it sends a signal to the main control module 2133. When the conference client B31 to which the second instant message client B41 corresponds is in a busy state, the main control module 2133 sends a prompt message to the first instant message client A31 via the instant message server 221, prompting that the second instant message client B41 cannot make a timely response to the instant message. In a preferred embodiment, the main control module 2133 further estimates the time period during which the conference client B31 to which the second instant message client B41 corresponds is in a busy state, and adds the time period to the prompt message, informing the participant A of the conference.

The busy state in the conference includes, but not limited to, a state of desktop-sharing, and active states such as attentive listening or speaking in conference, etc. When a participant of the conference is in a busy state, it shows that the participant of the conference prefers not being interrupted, otherwise, the overall progress of the conference will be affected. In other words, when being in a busy state, the participant of the conference is inconvenient to make a timely response to the instant message sent by a third party. At this moment, the main control module 2133 sends a prompt message to the sender of the instant message via the instant message server 221, so as to prompt that the receiver of the instant message cannot make a timely response to the instant message, thereby improving the experiences of the user of the instant message.

Another embodiment of the message processing system in a network conference of the present invention shall be described taking a participant C as shown in FIG. 13 as an example:

receiving, by the receiving module 2131, a request for desktop-sharing initiated by the conference client C31;

judging, by the main control module 2133, the validity of the request for desktop-sharing;

when the request for desktop-sharing is valid, inquiring, by the state judging module 2132, to the instant message server 221 about the state of the instant message client C41 to which the participant C corresponds;

wherein, when the instant message client C41 is in online state, the main control module 2133 sends first prompt information to the conference client C31, prompting the participant C to modify the window pop-up setting of the instant message before desktop-sharing, so as to set the prompt box of the instant message not to pop up when new information is received;

further receiving, by the receiving module 2131, a request for canceling desktop-sharing initiated by the conference client C31;

further judging, by the main control module 2133, the validity of the request for canceling desktop-sharing;

when the request for canceling desktop-sharing is valid, inquiring, by the state judging module 2132, to the instant message server 221 about the state of the corresponding instant message client C41;

when the corresponding instant message client C41 is in a state of not making response to the instant message, sending, by the main control module 2133, second prompt information to the conference client C31, prompting the participant C whether or not window pop-up setting of the instant message needs to be restored.

The particular manners of setting are same as described in the above first embodiment, which would not be repeated.

Still another embodiment of the message processing system in a network conference of the present invention is to temporarily prevent instant information from being received by the participant of the conference desktop-sharing by setting a delay sending strategy of the instant message server, buffer the instant information sent to the participant of the conference desktop-sharing, and resend the buffered instant message when the participant of the conference cancels desktop-sharing, thereby protecting the private information of the user without affecting progress of the conference, and improving the experiences of the user. Following description is given taking the transfer of information between a participant A and a participant C as an example:

receiving, by the receiving module 2131, a request for desktop-sharing initiated by the conference client C31 to which the participant C corresponds to the conference application server 211;

judging, by the state judging module 2132, whether or not the request for desktop-sharing of the conference client C31 is successful;

when the request for desktop-sharing of the conference client C31 is successful, setting, by the main control module 2133, a instant message receiving strategy of the participant C.

Temporarily preventing, by the instant message server 221, the instant message from being sent to the instant message client C41 to which the conference client C31 corresponds according to the instant message receiving strategy.

For example, when the instant message server 221 receives the instant message sent by the instant message client A41 to the instant message client C41 to which the conference client C31 desktop-sharing corresponds, the instant message server 221 temporarily prevents the instant message from being sent to the instant message client C41 according to the instant message receiving strategy set by the main control module 2133, and buffers the instant message.

And the instant message server 221 further sends instant prompt information to the instant message client A41, prompting that the instant message client C41 cannot make a timely response to the instant message sent by it due to being in a busy state in the conference.

When the conference client C31 cancels the state of desktop-sharing, the main control module 2133 controls the instant message server 221 to send the buffered instant message to the instant message client C41. Furthermore, at this moment, prompt information of "message delivered"

may also be sent to the instant message client A41, prompting that the participant C of the conference has received the instant message sent by it.

In summary, different from the prior art, the processing method and processing system for instant messages in a network conference of the embodiments of the present invention control message transfer between a conference application server and a conference client or between an instant message server and an instant message client according to the state of the conference client and the state of the instant message client, incorporate two communication manners of network conference and instant message, prompt the participant of the conference going to share desktop to disable the pop-up setting of an instant message, or temporarily prevent the instant message from being sent to the instant message client of the participant of the conference sharing desktop, thereby protecting the private information of the user. And on the other hand, when the participant of the conference is in an active state in the conference and inconvenient to make a response to the instant message, the conference application server will initiatively assist the user to make response to the instant message, prompting the progress of the conference to the sender, and improving the experiences of the user.

What are described above are merely embodiments of the present invention, and all the equivalent structures or equivalent flow modifications made using the contents of the description and drawings of the present invention, or direct or indirect application in other related technological fields, shall be also covered by the protection scope of the present invention.

What is claimed is:

1. A method for controlling instant message (IM) delivery to one or more participants in a network conference meeting, comprising:
   receiving, by a conference server, a request from a conference client of a participant to participate in the network conference meeting;
   based on the request, adding, by the conference server, the participant to the network conference meeting by connecting the conference client of the participant;
   establishing, by the conference server, a connection with an IM server, for controlling a flow of IM messages between the IM server and an IM client of the participant during the network conference meeting;
   receiving, by the conference server, a notification from the IM server, wherein the notification indicates that the IM server receives an IM sent from another IM client before the IM is delivered to the IM client of the participant;
   during the network conference meeting, determining, by the conference server, a status of the conference client of the participant in the conference;
   controlling, by the conference server, the IM server through the established connection to prevent the IM being sent to the IM client of the participant when the determined status of the conference client is busy;
   wherein determining the status of the participant in the conference is busy comprises:
   receiving, by the conference server, a request for desktop-sharing sent by the conference client of the participant;
   determining, by the conference server, the conference client the participant is in a desktop-sharing status in the conference when the request for the desktop-sharing is valid; and
   wherein, controlling, by the conference server, the IM server to prevent the IM being sent to the IM client of the participant comprises: sending, by the conference server, first prompt information to the IM server via the established connection, wherein the first prompt information is used for instructing the IM server not to send the IM from the another IM client to the IM client of the participant.

2. The method according to claim 1, wherein before controlling, by the conference server, the IM server to prevent the IM being sent to the IM client of the participant when the determined status is busy, the method further comprises:
   acquiring, by the conference server, a conference terminal ID or a telephone number calling into the conference of the participant;
   acquiring, by the conference server, an IM ID of the participant in an enterprise contact book according to the conference terminal ID or the telephone number; and
   saving, by the conference server, at least one of a first correspondence between the conference terminal ID and the IM ID, and a second correspondence between the telephone number and the IM ID.

3. The method according to claim 2, further comprising:
   determining, by the conference server, the IM client of the participant corresponding to the conference client of the participant, according to the saved first correspondence or the saved second correspondence.

4. The method according to claim 1, wherein before receiving, by the conference server, the notification from the IM server, the method further comprises:
   sending, by the conference server, a request for registration monitoring to the IM server for requesting monitoring an IM session of the participant in the conference.

5. The method according to claim 4, wherein receiving, by the conference server, the notification from the IM server comprises:
   receiving, by the conference server, the IM from the IM server.

6. The method according to claim 5, wherein the instant prompt message further comprises a time length of the conference.

7. The method according to claim 1, further comprising:
   receiving, by the conference server, a request for canceling the desktop-sharing sent by the conference client of the participant;
   determining, by the conference server, the participant is not in the desktop-sharing status in the conference when the request for canceling the desktop-sharing is valid; and
   sending, by the conference server, second prompt information to the IM server via the established communication channel, wherein the second prompt information is used for instructing the IM server to send the IM from the another IM client to the IM client of the participant.

8. The method according to claim 7, wherein,
   the first prompt information is further used for instructing the IM server to buffer the IM sent by the another IM client to the IM client of the participant; and
   the second prompt information is further used for instructing the IM server to send the buffered IM to the IM client of the participant.

9. The method according to claim 1, wherein the method further comprises:
   sending, by the conference server, third prompt information to the IM client via the IM server, wherein the third prompt information is used for prompting the participant in the conference to close a window pop-up setting of the IM.

10. The method according to claim 9, wherein the method further comprises:
sending, by the conference server, fourth prompt information to the IM client via the IM server via the established communication channel, wherein the fourth prompt information is used for prompting the participant in the conference to restore the window pop-up setting of the IM.

11. A computer program product comprising computer executable instructions stored on a non-transitory computer readable medium in such a way that when executed by a computer processor of a conference server, cause the conference server to control instant message (IM) delivery to one or more participants in a network conference meeting by performing the following:
receiving a request from a conference client of a participant to participate in the network conference meeting;
based on the request, adding the participant to the network conference meeting by connecting the conference client of the participant;
establishing a connection with an IM server, for controlling a flow of IM messages between the IM server and an IM client of the participant during the network conference meeting;
receiving a notification from the IM server, wherein the notification indicates that the IM server receives an IM sent from another IM client before the IM is delivered to the IM client of the participant;
during the network conference meeting, determining a status of the conference client of the participant in the conference; and
when the determined status is busy, controlling the IM server through the established connection to prevent the IM being sent to the IM client of the participant;
wherein determining the status of the participant in the conference is busy comprises:
receiving, by the conference server, a request for desktop-sharing sent by the conference client of the participant;
determining, by the conference server, the conference client the participant is in a desktop-sharing status in the conference when the request for the desktop-sharing is valid; and
wherein, controlling, by the conference server, the IM server to prevent the IM being sent to the IM client of the participant comprises: sending, by the conference server, first prompt information to the IM server via the established connection, wherein the first prompt information is used for instructing the IM server not to send the IM from the another IM client to the IM client of the participant.

12. The computer program product of claim 11, wherein before the control the IM server through the established connection, the computer executable instructions further cause the conference server to:
acquire a conference terminal ID or a telephone number calling into the conference of the participant;
acquire an IM ID of the participant in an enterprise contact book according to the conference terminal ID or the telephone number; and
save at least one of a first correspondence between the conference terminal ID and the IM ID, and a second correspondence between the telephone number and the IM ID.

13. The computer program product of claim 12, wherein the computer executable instructions further cause the conference server to:
determine the IM client of the participant corresponding to the conference client of the participant, according to the saved first correspondence or the saved second correspondence.

14. The method according to claim 1, further comprising:
sending, by the conference server, an instant prompt message to the IM server, wherein the instant prompt message prompts the another IM client via the IM server that the IM client of the participant cannot make a timely response due to being in the busy state in the conference.

15. The method according to claim 1, wherein determining the status of the participant in the conference is busy comprises:
determining, by the conference server, the participant is speaking.

16. A method for controlling instant message (IM) delivery to one or more participants in a network conference meeting, comprising:
receiving, by a conference server, a request from a conference client of a participant to participate in the network conference meeting;
based on the request, adding, by the conference server, the participant to the network conference meeting by connecting the conference client of the participant;
establishing, by the conference server, a connection with an IM server, for controlling a flow of IM messages between the IM server and an IM client of the participant during the network conference meeting;
receiving by the conference server, a notification from the IM server, wherein the notification indicates that the IM server receives an IM sent from another IM client before the IM is delivered to the IM client of the participant;
during the network conference meeting, determining, by the conference server, a status of the conference client of the participant in the conference; and
when the determined status is busy, sending, by the conference server, an instant prompt message to the another IM client via the IM server, wherein the instant prompt message prompts the another IM client that the IM client of the participant cannot make a timely response;
wherein determining the status of the participant in the conference is busy comprises:
receiving, by the conference server, a request for desktop-sharing sent by the conference client of the participant;
determining, by the conference server, the conference client the participant is in a desktop-sharing status in the conference when the request for the desktop-sharing is valid; and
wherein, controlling, by the conference server, the IM server to prevent the IM being sent to the IM client of the participant comprises: sending, by the conference server, first prompt information to the IM server via the established connection, wherein the first prompt information is used for instructing the IM server not to send the IM from the another IM client to the IM client of the participant.

17. The method according to claim 16, wherein the instant prompt message further comprises a time length of the conference.

18. The computer program product of claim 11, wherein the computer executable instructions further cause the conference server to:
send an instant prompt message to the IM server, wherein the instant prompt message prompts the another IM client via the IM server that the IM client of the participant cannot make a timely response due to being in the busy state in the conference.

\* \* \* \* \*